United States Patent [19]

Shih

[11] 3,963,802
[45] June 15, 1976

[54] BLEND OF ETHYLENE COPOLYMER ELASTOMER AND A COPOLYETHERESTER ELASTOMER

[75] Inventor: Chi-Kai Shih, Wilmington, Del.

[73] Assignee: E. I. Du Pont de Nemours and Company, Wilmington, Del.

[22] Filed: June 20, 1975

[21] Appl. No.: 588,844

[52] U.S. Cl. .............................. 260/873; 260/40 R
[51] Int. Cl.$^2$ ............................................ C08L 67/06
[58] Field of Search ...................... 260/873, 40 R

[56] References Cited
UNITED STATES PATENTS

| 3,223,752 | 12/1965 | Tate | 260/873 |
|---|---|---|---|
| 3,431,322 | 3/1969 | Caldwell et al. | 260/873 |
| 3,534,120 | 10/1970 | Ando et al. | 260/873 |
| 3,546,319 | 12/1970 | Prevorsek et al. | 260/873 |
| 3,627,712 | 12/1971 | Leibu | 260/873 |
| 3,644,267 | 2/1972 | Jackson, Jr. et al. | 260/873 |
| 3,718,715 | 2/1973 | Crawford et al. | 260/873 |
| 3,795,644 | 3/1974 | Jackson, Jr. et al. | 260/873 |

*Primary Examiner*—Murray Tillman
*Assistant Examiner*—J. Ziegler

[57] ABSTRACT

An elastomer comprising a blend of (A) an ethylene copolymer and (B) a copolyetherester derived from a dicarboxylic acid, a diol, and a poly(oxyalkylene)glycol.

9 Claims, No Drawings

BLEND OF ETHYLENE COPOLYMER ELASTOMER AND A COPOLYETHERESTER ELASTOMER

BACKGROUND OF THE INVENTION

It is known to prepare thermoplastic elastomeric copolyetheresters, which are essentially linear, by reacting together a mixture of a dicarboxylic acid (or its ester), a long chain polymeric glycol, and a low molecular weight diol in suitable proportions. The product is a segmented block copolyetherester composed both of long chain ester units, which are those segments of the polymer chain derived from the esterification of the long chain glycol with the dicarboxylic acid, and short chain ester units derived from the esterification of the low molecular weight diol with the dicarboxylic acid. In a specific embodiment copolyetherester elastomers are prepared by copolymerization of dimethyl terephthalate (DMT), butanediol, and poly(tetramethylene ether)glycol (PTMEG). The polyester units of DMT and butanediol form a high-melting hard segment in the block copolyetherester, while the long chain ester units provide high elongation to the segmented copolyetherester.

These copolyetheresters can be prepared by known procedures to provide elastomers having good tensile strength, tear strength, abrasion resistance, etc., but their hardness and their cost has limited their market penetration. Accordingly, there has existed a need for a means of lowering the hardness and the cost of existing copolyetherester elastomers, but without loss of its most important physical properties, particularly toughness. Attempts to soften the copolyetherester by addition of increased amounts of PTMEG have produced unfavorable side effects in that the melting point and elastomeric properties of the copolyetherester have been affected adversely and the cost has been increased. Attempts to soften the polymer by the addition of plasticizers of low or intermediate molecular weight which are structurally similar, e.g., polyester or polyethers, has led to similar adverse results. There is need for a cheaper substitute additive which can be blended with the copolyetherester to soften it but without adversely affecting its physical properties.

SUMMARY OF THE INVENTION

In accordance with the present invention, segmented copolyetherester elastomers are made softer, with retention of toughness and other physical properties, by blending therewith certain ethylene copolymers in specific proportions.

More specifically, the present invention is directed to a blend of (A) and ethylene copolymer in which the comonomer is selected from the group consisting of alphaolefins and nonconjugated diolefins, said copolymer having a melting point not greater than 85°C., and (B) a copolyetherester elastomer consisting of 15–95% by weight of short chain ester units derived from a dicarboxylic acid having a molecular weight not greater than 300 and a diol having a molecular weight not greater than 250, and 5–85% by weight of long chain ester units derived from a dicarboxylic acid having a molecular weight not greater than 300, and a poly(oxyalkylene ether)glycol having a molecular weight of 400–6000, said copolyetherester having a melting point of at least 100°C.; the weight ratio of A:B in said blend being 1:20 to 20:1 with the provisos that (a) when said copolyetherester contains less than 20% by weight of long chain ester units, the ratio A:B is either less than 1:2 or greater than 2:1, and (b) when said ethylene copolymer has a melting point not greater than 25°C., the ratio A:B is not greater than 1:1.

DETAILED DESCRIPTION

ETHYLENE COPOLYMER (A). This is derived from ethylene and an alpha-olefin, a nonconjugated diolefin, or both, as comonomers, the main requirement being that the ethylene copolymer shall have a melting point not greater than 85°C.

The alpha-olefin has the structure R—CH=CH$_2$ where R is a $C_1$–$C_8$ alkyl radical. Representative examples are: propylene; 1-butene; 4-methyl-1-pentene; 1-pentene; 1-hexene; 1-heptene; 1-octene; 1-nonene; 1-decene; 5-methyl-1-nonene; 5,5-dimethyl-1-octene; 4-methyl-1-hexene; 4,4-dimethyl-1-pentene; 5-methyl-1-hexene; 4-methyl-1-heptene; 5-methyl-1-heptene; 6-methyl-1-heptene; 4,4-dimethyl-1-hexene; and 5,6,6-trimethyl-1-heptene.

The diolefin may contain 5 to 24 carbon atoms in either a straight or branched chain or a cyclic structure. Examples of suitable diolefins in which both double bonds are terminal are 1,4-pentadiene, 1,5-hexadiene (biallyl) 2-methyl-1,5-hexadiene, 3,3-dimethyl-1,5-hexadiene, 1,7-octadiene, 1,9-decadiene, 1,19-eisocadiene, and the like. Usually diolefins in which only one double bond is terminal are preferred over those diolefins in which both double bonds are terminal. In the latter all the unsaturation tends to be used up in the copolymerization with the monoolefins, thus reducing the residual unsaturation required for good curing properties. This requires large initial proportions of diolefins. On the other hand, when one double bond of the diolefin is internal and is preferably also shielded by alkyl groups it does not react in the copolymerization but remains intact in the product, and these internal double bonds still make the product readily vulcanizable with sulfur. Examples of diolefins with only one internal double bond are 1,4-hexadiene, 1,9-octadecadiene and the like. Of particular interest are 6-methyl-1,5-heptadiene, 7-methyl-1,6-octadiene, 11-ethyl-1,11-tridecadiene, and similar compounds in which the internal double bond is shielded.

Cyclic dienes of use in preparing the ethylene copolymer include 4-vinyl-cyclohexene, 1,5-cyclooctadiene, tetrahydroindene, 5-ethylidene-2-norborene, 5-alkyl-2,5-norbornadiene and dicyclopentadiene. While the property of being curable is not essential to the present invention, most of the commercially available ethylene terpolymers, derived in part from a diolefin, contain residual unsaturation permitting curing or vulcanization.

Ethylene copolymers and their preparation are well known in the art. For example, it is known to prepare copolymers of ethylene and an alpha-olefin and terpolymers of ethylene, an alpha-olefin and a diene. Representative preferred polymers obtainable by this process include ethylene/propylene and ethylene/1-butene copolymers and ethylene/propylene/1,4-hexadiene terpolymers. In essence, the process involves copolymerization of the selected monomers in a hydrocarbon or a halogenated hydrocarbon solvent at −30° to 50°C. in the presence of a coordination catalyst, with the usual precautions of excluding oxygen, water vapor and carbon dioxide.

A review of preparative methods and resulting copolymers and terpolymers can be found in the *Encyclopedia of Polymer Science and Technology*, Volume 6, pps. 338–387, Interscience Publishers (1967). It should be noted that the melting point of ethylene copolymers is in most instances related to the ethylene content of the copolymer, with increasing amounts of ethylene resulting in higher melting copolymers. This point is illustrated in the reference just cited.

In that embodiment wherein ethylene is copolymerized with both an alpha-olefin and a nonconjugated diene, the latter two can be selected from among the respective groups described above. Preferred terpolymers are prepared from ethylene, an open chain alpha-olefin of 2 to 18 carbon atoms, and an open chain nonconjugated diolefin having at least one terminal double bond. The polymerization is conducted in an inert hydrocarbon or halogenated hydrocarbon solvent in the presence of a coordination catalyst at temperatures from ambient up to 150°C. The terpolymers of ethylene/propylene/1,4-hexadiene are especially preferred.

Another terpolymer operative in the compositions of this invention is a sulfur-curable copolymer of ethylene, at least one alpha-monoolefin having the structure $R—CH=CH_2$ where R is an alkyl radical of not more than 8 carbon atoms and at least one 2-alkylnorbornadiene having about 8 to 24 carbon atoms; said copolymer having an iodine number between 5 and 60. The 2-alkylnorbornadiene may be described by this formula:

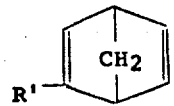

wherein R' is a $C_1–C_{17}$ alkyl radical.

Representative examples include: 2-methylnorbornadiene; 2-ethylnorbornadiene; 2-propylnorbornadiene; 2-isopropylnorbornadiene; 2-n-butylnorbornadiene; 2-isobutylnorbornadiene; 2-tert-butylnorbornadiene; 2-n-amylnorbornadiene; 2-(3-methylbutyl) norbornadiene; 2-neopentylnorbornadiene; 2-n-hexylnorbornadiene; 2-n-octylnorbornadiene; 2-n-nonylnorbornadiene; 2-n-dodecylnorbornadiene; and 2-n-heptadecylnorbornadiene.

Ethylene/alpha-olefin/2-alkyl-norbornadiene copolymers may be prepared by contacting ethylene, at least one alpha-monoolefin, and at least one 2-alkylnorbornadiene in solution in specific inert solvents with specific coordination catalysts, as hereinafter described, at temperatures between about 20°C. and 100°C. and at atmospheric or superatmospheric pressure. As usual, one should exclude oxygen, water vapor, and carbon dioxide. The copolymers obtained as a result of this process are rubbery, high molecular weight elastomer capable of being sulfur-cured to form elastomeric vulcanizates.

Another useful ethylene copolymer is a rubbery copolymer of ethylene, at least one alpha-olefin having the structure $R—CH=CH_2$, where R is a $C_1–C_8$ alkyl radical, and dicyclopentadiene, with the proviso that the copolymer shall contain at least about 20% ethylene units by weight, at least about 25% of said alpha-olefin units by weight, and about 0.5% to 10% of dicyclopentadiene units by weight. These copolymers can be prepared by contacting ethylene, at least one of said alpha-olefins, and dicyclopentadiene in solution in tetrachloroethylene with specific coordination catalyst, as hereinafter described, at temperatures between about 20°C. and 100°C., in the absence of oxygen and water vapor. The copolymers obtained as a result of this process are rubbery, high molecular weight elastomers capable of being sulfur-cured to form strong resilient elastomeric vulcanizates. Representative copolymers include: ethylene-propylene-dicyclopentadiene terpolymer, which is preferred, ethylene-1-butene-dicyclopentadiene terpolymer, ethylene-propylene-1-butene-dicyclopentadiene quaterpolymer, and ethylene-5-methyl-1-heptenedicyclopentadiene terpolymer. In order that these copolymers be elastomeric, they should contain at least about 20% ethylene monomer units by weight, at least about 25% $R—CH=CH_2$ monomer units (as described) by weight, and no more than about 10% dicyclopentadiene monomer units by weight. The ethylene monomer unit concentration ranges in general from about 20% to about 74.5% by weight.

SEGMENTED COPOLYETHERESTER (B). This is produced by reacting together in a mixture at least one long chain glycol, at least one low molecular weight diol, and at least one dicarboxylic acid. The long chain glycol and the dicarboxylic acid react to form segments of the copolyetherester chain which are designated as long chain ester units. The short chain ester units are segments of the copolyetherester chain which are the reaction product of the low molecular weight diol and the dicarboxylic acid. The reaction is conducted by conventional methods and conditions. The short chain ester units should be chosen so that a polymer made up solely of short chain ester units and having a molecular weight in the fiber-forming range (>5000), has a melting point of at least 150°C. The melting point is determined differential scanning calorimitry using the procedure described hereinafter.

Generally, the long chain and the short chain units combine to form the copolyetherester polymer according to their tendencies to react under the conditions used. This order of combination can be termed random or statistical. The various ester units are combined in a head-to-tail arrangement through ester linkages forming a substantially intralinear polymer. The exact polymer chain configuration is not critical as long as the various reactant and proportion parameters are met.

Copolyetherester polymers useful in this invention have 5–85 weight percent long chain ester units and at least 50 mole percent of the total short chain ester units of the same type, i.e., derived from one type of acid and one type of low molecular weight diol. Preferred copolyetherester polymers also have an inherent viscosity of at least 0.75 determined by the method described hereinafter.

Copolyetherester polymers useful in this invention can be conveniently made by conventional ester interchange reaction. A preferred procedure involves heating at about 150°–260°C. the dimethyl ester of a dicarboxylic acid with a long chain glycol and a molar excess of a short chain diol in the presence of an ester interchange catalyst. Methanol formed by the interchange reaction is distilled off and heating is continued until methanol evolution is completed. The interchange reaction or polymerization is typically complete within a few minutes to a few hours depending upon the particular temperature, catalyst, glycol excess, and reactants used. This procedure produces a low molecular weight prepolymer which can be transformed into high molecular weight copolyetherester by additional ester interchange as described herein.

Low molecular weight ester prepolymer can be prepared by other ester interchange procedures. A long chain glycol can be reacted with a high or low molecular weight short chain ester homopolymer or copolymer in the presence of ester interchange catalyst until a random ester prepolymer is produced by the interchange reaction. Short chain ester homopolymer or copolymer can be prepared by ester interchange from either dimethyl esters and low molecular weight diols, as above, or from free acids with diol acetates. Short chain ester copolymer can be prepared by direct esterification of appropriate acids, anhydrides, or acid chlorides with diols or, alternatively, by reaction of the acids with cyclic ethers or carbonates. Ester prepolymer can also be prepared by using a long chain glycol in place of a diol or using a mixture of reactants.

Molecular weight of the ester prepolymer is increased by removing excess short chain diol by distilling it from the prepolymer. This operation is frequently referred to as "polycondensation". Additional ester interchange occurs during the distillation to increase the molecular weight and to further randomize the arrangements of the copolyestherester units. The distillation conditions typically are less than 1 mm. Hg, at 220°–280°C. Antioxidants, such as sym-di-beta-naphthyl-p-phenylene-diamine and 1,3,5-trimethyl-2,4,6-tris(3,5-ditertiary-butyl-4hydroxybenzyl)-benzene can be added to reduce degradation.

To increase the rate of ester interchange catalysts can be employed for the prepolymer and polycondensation steps. Any one of a wide variety of well known catalysts can be used, but organic titanates, such as tetrabutyl titanate either alone or combined with magnesium or zinc acetates, are preferred. Complex titanates derived from alkali or alkaline earth metal alkoxides and titanate esters are very effective. Inorganic titanates (such as lanthanum titanate), calcium acetate/antimony trioxide mixtures, and lithium and magnesium alkoxides are other catalysts which can be used.

Ester interchange polymerizations are generally run in a melt without added solvent, but inert solvent can be used to facilitate removal of volatile components from the mass at low temperatures. Both batch and continuous methods can be used for any stage of copolyetherester polymer preparation. Polycondensation of prepolymer can also be accomplished in the solid phase by heating finely divided solid prepolymer in a vacuum or in a stream of inert gas to remove liberated low molecular weight diol.

Long chain glycols which can be used to produce the copolyetherester polymers are substantially linear glycols having hydroxy groups on the chain which are terminal, or as nearly terminal as possible, and having a molecular weight of above about 400 and preferably 400–600.

Long chain glycols which can be used to prepare copolyetherester polymers useful in this invention include poly(alkylene oxide)glycols wherein the alkylene group has 2–9 carbon atoms, such as
poly(ethylene oxide)glycol,
poly(1,2- and 1,3-propylene oxide)glycol,
poly(tetramethylene oxide)glycol,
poly(pentamethylene oxide)glycol,
poly(hexamethylene oxide)glycol,
poly(heptamethylene oxide)glycol,
poly(octamethylene oxide)glycol,
poly(nonamethylene oxide)glycol,
poly(1,2-butylene oxide)glycol;
random or block copolymers of ethylene oxide and 1,2-propylene oxide, and poly-formals prepared by reacting formaldehyde with glycols, such as pentamethylene glycol, or mixtures of glycols, such as a mixture of tetramethylene and pentamethylene glycols.

Poly(tetramethylene oxide)glycol, poly(ethylene oxide)glycol, poly(1,2-propylene oxide)glycol, and poly(1,2-propylene oxide)glycol capped with ethylene oxide units are preferred long chain glycols.

Dicarboxylic acids which can be used to produce useful copolyetherester polymers are aliphatic, cycloaliphatic, or aromatic dicarboxylic acids of a low molecular weight, i.e., having a molecular weight of less than about 300. Dicarboxylic acids, as used herein, include acid equivalents having two functional carboxyl groups which perform substantially like dicarboxylic acids in reaction with glycols and diols forming copolyetherester polymers. These equivalents include esters, esterforming derivatives, such as acid halides and anhydrides, and other derivatives which behave substantially like dicarboxylic acids forming esters with glycols and diols. The molecular weight requirement pertains to the acid and not to its equivalent, ester or esterforming derivative. Thus, an ester of a dicarboxylic acid having a molecular weight greater than 300 or an acid equivalent of a dicarboxylic acid having a molecular weight greater than 300 are included provided the acid has a molecular weight below about 300. The dicarboxylic acids can contain any substituent groups or combinations which do not substantially interfere with the copolyetherester polymer formation and use of the polymer in the process of this invention.

Aliphatic dicarboxylic acids, as the term is used herein, refers to carboxylic acids having two carboxyl groups each attached to a saturated carbon atom. If the carbon atom to which the carboxyl group is attached is saturated and is in a ring, the acid is cycloaliphatic.

Aromatic dicarboxylic acids, as the term is used herein, are dicarboxylic acids having two carboxyl groups attached to a carbon atom in an isolated or fused benzene ring. It is not necessary that both functional carboxyl groups be attached to the same aromatic ring and where more than one ring is present, they can be joined by aliphatic or aromatic divalent radicals or divalent radicals such as —O— or —SO$_2$—.

Representative aliphatic and cycloaliphatic acids which can be used for this invention are sebacic acid, 1,3-cyclohexane dicarboxylic acid, 1,4-cyclohexane dicarboxylic acid, adipic acid, glutaric acid, succinic acid, oxalic acid, azelaic acid, diethylmalonic acid, allylmalonic acid, 4-cyclohexene-1,2-dicarboxylic acid, 2-ethylsuberic acid, 2,2,3,3-tetramethylsuccinic acid, cyclopentanedicarboxylic acid, decahydro-1,5-naphthylene dicarboxylic acid, 4,4'-bicyclohexyl dicarboxylic acid, decahydro-2,6-naphthylene dicarboxylic acid, 4,4'-methylene-bis-(cyclohexyl carboxylic acid, 3,4-furan dicarboxylic acid, and 1,1-cyclobutane dicarboxylic acid. Preferred aliphatic acids are cyclohexanedicarboxylic acids and adipic acid.

Representative aromatic dicarboxylic acids which can be used include phthalic, terephthalic, and isophthalic acids, bibenzoic acid, substituted dicarboxyl compounds with two benzene nuclei such as bis(p-carboxyphenyl)methane, p-oxy9p-carboxyphenyl) benzoic acid, ethylene-bis(p-oxybenzoic acid), 1,5-naphthalene dicarboxylic acid, 2,6-naphthalene dicarboxylic acid, 2,7-naphthalene dicarboxylic acid, phenanthrene dicarboxylic acid, anthracene dicarboxylic acid, 4,4'-sulfonyl dibenzoic acid, $C_1$–$C_{12}$ alkyl and ring substitution derivatives thereof, such as halo, alkoxy, and aryl derivatives. Hydroxyl acids such as p-(beta-hydroxyethoxy) benzonic acid can also be used providing an aromatic dicarboxylic acid is also present.

Aromatic dicarboxylic acids are a preferred class for preparing the copolyetherester polymers useful in this invention. Among these aromatic acids those with 8 to 16 carbon atoms are preferred, particularly the phenylene dicarboxylic acids, i.e., phthalic, terephthalic, and isophthalic acids.

Low molecular weight diols which can be used are aliphatic, cycloaliphatic, and aromatic diols having a molecular weight of less than about 250 and two functional hydroxyl groups. Diol equivalents which form esters with dicarboxylic acids are included and the molecular weight requirement applies only to the diol and not to its equivalent. Such equivalents are illustrated by ethylene oxide and ethylene carbonate which can be used in the place of ethylene glycol. However, ethylene glycol cannot be used as the low molecular weight diol when all or part of the dicarboxylic acid is an aliphatic acid because of the relatively poor hydrolytic stability of copolyetheresters containing such short chain ester units.

The terms aliphatic, cycloaliphatic, and aromatic as used to define the diols useful for this invention have the same general meaning as applied to the dicarboxylic acids and glycols set forth herein with the location of the functional hydroxyl groups being the determining factor similar to the location of the carboxyl groups for the dicarboxylic acids.

Preferred low molecular weight diols useful in the process of this invention include diols having 2 to 15 carbon atoms such as ethylene, 1,2- or 1,3-propylene, isobutylene, tetramethylene, pentamethylene, 2,2-dimethyltrimethylene, hexamethylene, and decamethylene glycols, dihydroxy cyclohexane, cyclohexane dimethanol, hydroquinone-bis(beta-hydroxyethyl)ether resorcinol, hydroquinone, 1,5-dihydroxy naphthalene, etc. Especially preferred are aliphatic diols containing 2 to 8 carbon atoms. Bis-phenols, such as bis(p-hydroxy) diphenyl, bis(p-hydroxyphenyl)methane and bis(p-hydroxyphenyl)propane can be used.

Preferred copolyetheresters are prepared from terephthalic acid, optionally containing up to 30% of isophthalic or phthalic acid, butanediol-1,4 and polytetramethylene ether glycol.

Fillers and pigments may be incorporated in the blend to increase the toughness and temperature resistance, e.g., very finely divided silica, alumina, or calcium carbonate. The use of fillers provided substantial improvements in properties and ease of preparation for blends in which the proportions of ethylene copolymer and copolyetherester are near the limits of this invention. The use of precipitated silica fillers even in limited amounts of a few percent facilitates blending of preferred polymers in preferred proportions. From 1 to 30% by weight of the blend may be added. Additives of processing aids may be used to further decrease the melt viscosity of the blends for more ease of application; of these terphenyl is preferred. Antioxidants and stabilizers also may be incorporated in the polymers to improve the thermal and oxidative stability at elevated temperatures.

The blending of the copolyetherester and the ethylene copolymer may be effected in various ways, including blending on hot rolls, mixing in the melt, or mixing in solution and then removing the solvent. A satisfactory small-scale procedure is to stir the two polymers together under an inert atmosphere in a flask immersed in a heating bath. A preferred method is to dry blend the polymers in powder or granular form and extrude the dry blend with a screw-type extruder. Melt blending of the two polymers in the absence of any processing aids such as solvents or plasticizers requires operations at temperatures near or above the softening point of the polymers, i.e., about 150°–250°C. The presence of a filler such as silica does not reduce the blending temperature required.

If the ethylene copolymer is designated as A, and the copolyetherester as B, these should be blended in proportions of 1:20 to 20:1 by weight, with the provisos that (a) when said copolyetherester contains less than 20% by weight of long chain ester units, the ratio A:B is less than 1:2 or greater than 2:1, and (b) when said ethylene copolymer has a melting point not greater than 25°C., the ratio A:B is not greater than 1:1. The provisos exclude compositions in which the two polymers fail to form blends exhibiting high toughness.

It is surprising that two polymers differing so in polarity can be effectively commingled to form a tough blend. Without being bound by any hypothesis, it is believed that stable, tough blends are obtained because of intermeshing or tangling of crystalline regions present in both polymers. When the ethylene copolymer has a melting point of less than 25°C., there are insufficient crystalline regions for effective tangling to occur, unless substantial amounts of copolyetherester are blended with it. When the copolyetherester contains less than 20% long chain ester units, there is so much crystallinity that intermingling with ethylene copolymer crystallized regions is largely prevented. The fact that certain fillers such as silica increase the ease of blending is consistent with this hypothesis.

Preferred blends are derived from ethylene copolymers having melting points of 35°–65°C. and copolyetheresters containing 35 to 65% by weight of long chain ester units. These polymers can be blended in proportions ranging from 1:20 to 20:1, but blends ranging from 1:20 to 1:1 are generally preferred, where the ratio is that of (A) ethylene copolymer to (B) copolyetherester.

While conventional blending methods have been described above, it is nevertheless surprising that addition of a nonpolar hydrocarbon polymer (the ethylene copolymer) to the copolyetherester elastomer, which is highly polar, provides such a good blend. The copolyetherester will not even swell in a nonpolar swelling agent such as hexane whereas the ethylene copolymer will dissolve in such an agent; yet the two elastomers have sufficient miscibility, or at least are so compatible with each other in the blend, that the traditional toughness of the copolyetherester elastomer is retained. This is indicated by its high values of $T_B$ and $E_B$ (tensile strength at break and elongation at break, respectively). The presence of the ethylene copolymer in the blend also decreases the hardness of the copolyetherester without changing the melting temperature of the copolyetherester. At the same time the heat resistance of the blend is superior to that of the copolyetherester.

The following examples illustrate the invention. All parts, proportions and percentages disclosed herein and throughout the specifications are by weight, unless otherwise indicated.

EXAMPLES

Copolyetherester A is prepared by ester interchange of 4.53 moles of dimethyl terephthalate hereinafter (DMT), 1.27 moles of dimethyl isophthalate hereinafter (DMI), 1.0 mole of polytetramethyleneether glycol hereinafter (PTMEG-980) (having a number average molecular weight about 980) and excess 1,4-butanediol in the presence of a tetrabutyl titanate/magnesium acetate catalyst and a stabilizer, 1,6-bis [3-(3,5-di-tert-butyl-4-hydroxyphenyl)propionamide]hexane. Ester interchange is conducted at atmospheric pressure up to a final temperature of 220°C. The ester interchange is followed by polycondensation at 250°C. at a pressure of about 133 Pa for about 90 minutes. The resulting polymer has an inherent viscosity of about 1.4 dl/g. It contains 51% by weight long chain ester units.

Copolyetherester B is prepared by ester interchange of 7.6 moles of DMT, 1 mole PTMEG-980 and excess 1,4-butanediol using the ester interchange and polycondensation conditions and catalyst and stabilizer described for the preparation of copolyetherester A. Copolyetherester B has an inherent viscosity of about 1.4 dl/g. It contains 40% by weight long chain ester units.

Copolyetherester C is prepared by ester interchange of 16.3 moles of DMT, 1.6 moles dimethyl phthalate, 1 mole PTMEG-980 and excess 1,4-butanediol using the ester interchange and polycondensation conditions and catalyst described for the preparation of copolyetherester A. Copolyetherester C has an inherent viscosity of about 1.3 dl/g. It contains 22% by weight long chain ester units.

Ethylene copolymer A is a terpolymer containing 72% by weight ethylene units, 24% propylene units and about 4% of units derived from 1,4-hexadiene. The polymer has a melting point of about 50°C. The Mooney viscosity, ML-10, at 120°C. is about 60, see ASTM D 1646-63.

Inherent viscosities of the copolyetheresters described hereinbefore are measured at 30°C. at a concentration of 0.5 g./dcl. in m-cresol.

Polymer melting points are determined by differential scanning calorimetry. Prior to melting point determination, polymer samples are conditioned by heating to 30°C. above the apparent melting point and cooling to 25°C. at a rate of 10°C./min. The heating rate employed for actual melting point determination is 10°C./min.

The following ASTM methods are employed in determining the properties of the polymers prepared in the examples which follow:

| | |
|---|---|
| Modulus at 100% elongation, $M_{100}$ | D412 |
| Permanent set at 100% elongation, $PS_{100}$ | D412 |
| Modulus at 300% elongation, $M_{300}$ | D412 |
| Tensile at break, $T_B$ | D412 |
| Permanent set at break, $PS_B$ | D412 |
| Elongation at break, % | D412 |
| Hardness, Shore A | D676 |
| Hardness, Shore D | D1484 |

Metric units are employed throughout the examples. Stress and pressure are given in MPa (megapascals) in accordance with the International System of Units. For convenience, 1000 psi = 6.895 MPa = 70.3 kg/cm.$^2$

EXAMPLE 1

Three polymer blends are prepared from copolyetherester A and ethylene copolymer A. Proportions and properties of the blends, as well as the properties of the starting polymers, are shown in Table I.

The blends are prepared by weighing up 60 g. batches of total stock. Before melt blending, the polymers are dried for 1 hour at 100°C. in a vacuum oven with a nitrogen sweep. Melt blending is performed in a Brabender Plastograph fitted with Sigma blades operated at 75 rpm and at a temperature of 180°C. The polymers are added to the Plastograph over about 2 min. and mixing is then continued for 10 min. Samples for physical testing are prepared by compression molding 76 × 136 × 1.9 mm slabs using a molding cycle of 3 min. at 180°C. followed by 5 min. at about 25°C. at a pressure of about 7MPa.

TABLE I

| | A | B | C | D | E |
|---|---|---|---|---|---|
| Copolyetherester A, parts | 100 | 80 | 50 | 20 | — |
| Ethylene copolymer A, parts | — | 20 | 50 | 80 | 100 |
| Hardness, Shore A | 92 | 90 | 85 | 79 | 77 |
| Hardness, Shore D | 40 | 35 | 30 | 25 | 26 |
| $M_{100}$, MPa | 6.9 | 5.5 | 4.0 | 2.1 | 2.5 |
| $M_{300}$, MPa | 9.6 | 7.6 | 5.5 | 3.1 | 4.1 |
| $T_B$, MPa | 37.2 | 20.7 | 12.4 | 12.4 | 12.4 |
| $E_B$, % | 885 | 825 | 700 | 700 | 600 |
| $PS_{100}$, % | 17 | 18 | 15 | 10 | 7 |
| Relative toughness; ($T_B \times E_B \times 10^{-2}$) | 329 | 171 | 87 | 87 | 74 |

All of the blends exhibit high values of $T_B$ and $E_B$ which result in high values of relative toughness, i.e., values in excess of 20. Surprisingly, none of the blends shows the sharp reductions in $T_B$ and $E_B$ and relative toughness which are characteristic of blends in which the components are incompatible. Blends in which the comonents are incompatible have values of relative toughness well below 20; i.e., values as low as about 1.0. The addition of only 20 parts of ethylene copolymer A to copolyetherester A causes a substantial reduction in hardness without seriously interfering with high temperature properties; for instance, the $M_{300}$ at 70°C. of copolyetherester A is 4.8 MPa, while that of the 80/20 blend is only lowered to 4.3 MPa.

EXAMPLE 2

Polymer blends are prepared using the proportions shown in Table II. Properties of the blends are also given in the Table.

TABLE II

|  | A | B | C | D | E | F | G | H |
|---|---|---|---|---|---|---|---|---|
| Copoyetherester A, pbw | 60 |  | 60 |  | 60 |  | 80 |  |
| Coplyetherester B, pbw |  | 60 |  | 60 |  | 60 |  | 80 |
| Ethylene copolymer A, pbw | 40 | 40 | 40 | 40 | 40 | 40 | 20 | 20 |
| Silica filler*, pbw |  |  | 20 | 20 |  |  |  |  |
| Carbon black, SRF, pbw |  |  |  |  | 20 | 20 |  |  |
| $M_{100}$, MPa | 7.1 | 9.9 | 7.1 | 8.4 | 8.1 | 10.1 | 7.4 | 15.2 |
| $T_B$, MPa | 9.9 | 11.2 | 14.5 | 14.8 | 13.0 | 12.6 | 23.9 | 18.6 |
| $E_B$, % | 400 | 265 | 530 | 535 | 385 | 250 | 605 | 260 |
| $PS_B$, % | 110 | 130 | 215 | 285 | 135 | 120 | 220 | 140 |
| Relative Toughness; ($T_B \times E_B \times 10^{-2}$) | 39.6 | 29.7 | 76.9 | 79.2 | 50.1 | 31.5 | 144.6 | 48.4 |
| Hardness, Shore D | 36 | 45 | 42 | 48 | 39 | 47 | 39 | 55 |

*Hi-Sil 233 — Precipitated, hydrated silica, PPG Industries, Pittsburgh, Pennsylvania Blends A and C are prepared by blending in a Banbury mixer using a temperature of about 180°C. The other blends are prepared in a twin screw extruder operated at 180°C. for Blends E and G and at 225°C. for blends B, D, F and H. In preparing blends containing filler (Blends C, D, E and F) the filler is first mixed with ethylene copolymer A in a Banbury mixer and the resulting masterbatch is mixed with copolyetherester A or B in the proportions shown.

Samples for physical testing are prepared by injection molding dumbells in a 28.3 g (1 ounce) injection molding machine operating at a barrel temperature of 180°C. for Blends A, C, E and G and 220°C. for Blends B, D, F and H. The ram pressure is 82 MPa, cycle time 1 minute and mold temperature is 25°C.

As can be seen from the results shown in Table II, all of the blends exhibit good toughness, i.e., a value in excess of 20. The presence of the silica filler yields blends having exceptional toughness. In order to obtain maximum reduction of hardness, the use of fillers should be avoided or the amount of filler minimized as shown by comparing the hardness of Blends A, C and E based on copolyetherester A and Blends B, D and F based on copolyetherester B.

EXAMPLE 3

Three blends of copolyetherester C and ethylene copolymer A are prepared using the proportions shown in Table III. The procedure of Example 1 is used for preparing blends B and D, with the exception that the temperature in the Brabender Plastograph is 225°C. Samples for physical testing of blends B and D are also prepared by the procedures of Example 1 with the exception that compression molding is carried out at 225°C. Blend C is prepared by mixing the polymers in a Brabender mixer at 225°C. and samples for physical testing are prepared by injection molding under the conditions in Example 2 with a barrel temperature of 225°C.

The above results show the reduction of hardness associated with the addition of ethylene copolymer to the copolyetherester while toughness is retained.

I claim:

1. An elastomeric blend of (A) an ethylene copolymer in which the comonomer is selected from the group consisting of an alpha-olefin, a nonconjugated diolefin, and a mixture of both, said copolymer having a melting point not greater than 85°C., and (B) a segmented copolyetherester consisting of 15–95% by weight of short chain ester units which can be derived from a dicaboxylic acid having a molecular weight not greater than 300 and a diol having a molecular weight not greater than 250, and 5–85% by weight of long chain ester units which can be derived from a dicarboxylic acid having a molecular weight not greater than 300 and a poly(oxyalkylene)glycol having a molecular weight of 400–6000, said copolyetherester having a melting point of at least 100°C.; the weight ratio of A:B in said blend being 1:20 to 20:1, with thw provisos that (a) when said copolyetherester contains less than 20% by weight of long chain ester units, the ratio of A:B is less than 1:2 or greater than 2:1 and (b) when said ethylene copolymer has a melting point not greater than 25°C., the ratio of A:B is not greater than 1:1.

2. The blend of claim 1 wherein ethylene copolymer (A) has a melting point of 35°–65°C. and copolyetherester (B) contains 35–65% by weight of long chain ester units, and these polymers are blended in proportions of A:B ranging from 1:20 to 20:1.

3. The blend of claim 2 wherein the weight ratio of A:B is from 1:20 to 1:1.

4. The blend of claim 1 wherein ethylene copolymer (A) is an ethylene/propylene/1,4-hexadiene or an ethylene/propylene/ethylidene norbornene terpolymer.

5. The blend of claim 1 wherein copolyetherester (B) is prepared from poly(tetramethylene ether)glycol, 1,4-butanediol, and terephthalic acid, optionally containing up to 30% of isophthalic or phthalic acid.

TABLE III

|  | A | B | C | D | E |
|---|---|---|---|---|---|
| Copolyetherester C, parts | 100 | 80 | 50 | 20 | — |
| Ethylene copolymer A, parts | — | 20 | 50 | 80 | 100 |
| Hardness, Shore A | — | 97 | 92 | 83 | 77 |
| Hardness, Shore D | 63 | 55 | 42 | 29 | 26 |
| $M_{100}$, MPa | 17.2 | 13.7 | 7.6 | 2.3 | 2.5 |
| $M_{300}$, MPa | 24.3 | 17.9 | 9.9 | 2.8 | 4.1 |
| $T_B$, MPa | 43.4 | 21.8 | 13.8 | 10.8 | 12.4 |
| $E_B$, % | 530 | 420 | 470 | 720 | 600 |
| $PS_{100}$, % | — | 38 | 30 | 19 | 7 |
| Relative toughness; ($T_B \times E_B \times 10^{-2}$) | 230 | 92 | 65 | 78 | 74 |

6. The blend of claim 1 wherein a filler and pigment is incorporated into the blend.

7. The blend of claim 1 wherein a silica filler is incorporated into the blend.

8. A copolyetherester-containing polymer blend, the copolyetherester of which consists of 15–95% by weight of short chain ester units derived from a dicarboxylic acid having a molecular weight not greater than 300 and a diol having a molecular weight not greater than 250, and 5–85% by weight of long chain ester units derived from a dicarboxylic acid having a molecular weight not greater than 300 and a poly(oxyalkylene) glycol having a molecular weight of 400–6000, said copolyestherester having a melting point of at least 100°C., characterized in that said copolyetherester is blended with an ethylene copolymer having a melting point not greater than 85°C., the comonomer of which is selected from the group consisting of an alpha-olefin, a nonconjugated diolefin, and a mixture of both, these polymers being blended in amounts such that the weight ratio of ethylene copolymer (A) to copolyetherester (B) in the blend is 1:20 to 20:1, with the provisos that (a) when said copolyetherester contains less than 20% by weight of long chain ester units the raio of A:B is less than 1:2 or greater than 2:1, and (b) when said ethylene copolymer has a melting point not greater than 25°C., the ratio of A:B is not greater than 1:1.

9. The blend of claim 3 wherein ethylene copolymer (A) is an ethylene/propylene/1,4-hexadiene or an ethylene/propylene/ethylidene norbornene terpolymer and copolyetherester (B) is prepared from poly(tetramethylene ether) glycol, 1,4-butanediol, and terephthalic acid, optionally containing up to 30% of isophthalic or phthalic acid.

* * * * *